Figure 1:
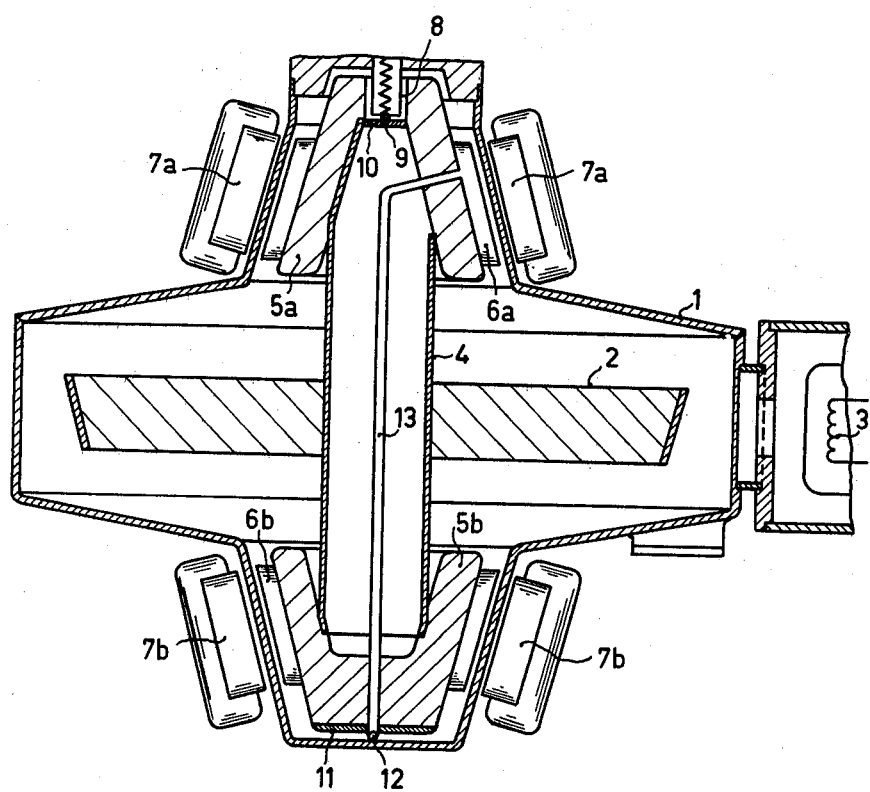

United States Patent [19]

Hartl et al.

[11] 4,081,707
[45] Mar. 28, 1978

[54] X-RAY ROTATING-ANODE TUBE WITH A MAGNETIC BEARING

[75] Inventors: Walter Hartl; Harry Eggelsmann, both of Hamburg, Germany; Claus-Peter Hodum, Eindhoven, Netherlands

[73] Assignee: U.S. Philips Corporation, New York, N.Y.

[21] Appl. No.: 753,181

[22] Filed: Dec. 22, 1976

[30] Foreign Application Priority Data

Jan. 16, 1976 Germany .............................. 2601529

[51] Int. Cl.² .............................................. H01J 35/04
[52] U.S. Cl. ..................................... 313/60; 313/149; 313/152
[58] Field of Search .......................... 313/60, 149, 152

[56] References Cited

U.S. PATENT DOCUMENTS 4,024,424  5/1977  Eggelsmann et al. ................. 313/60

Primary Examiner—Rudolph V. Rolinec
Assistant Examiner—Darwin R. Hostetter
Attorney, Agent, or Firm—Frank R. Trifari

[57] ABSTRACT

X-ray tubes with a magnetic bearing either have the disadvantage that the anode must be at earth potential, so that an asymmetric high-voltage supply is required or that — in the case of a symmetric high voltage — a relatively wide air gap is necessary which requires a high driving force and a bearing which has a certain amount of drawbacks. The invention provides an insulator between the anode which is at the high-voltage potential and the rotor which is at the earth potential, so that the air-gap between the rotor and stator can be relatively small and an effective magnetic bearing is possible.

5 Claims, 2 Drawing Figures

X-RAY ROTATING-ANODE TUBE WITH A MAGNETIC BEARING

The invention relates to an X-ray rotating anode tube with magnetic bearing of a rotary shaft of an anode disc which, during operation, is at the high voltage potential, the high voltage potential being supplied via a sliding contact which is in contact with the rotary shaft.

Such an X-ray rotating anode tube is known from, for example, German Offenlegungsschrift 22 62 757. In one of the X-ray tubes described therein the stator is at earth potential whereas the rotating anode disc and the rotor are at high voltage potential. Between the stator and the rotor there must be, to guarantee the high voltage strength of the X-ray tube, a relatively wide gap. However, this gap weakens the magnetic field between rotor and stator so that the magnetic bearing becomes less "rigid" or stronger stator magnets are required for a sufficient magnetic bearing. To obviate these difficulties another embodiment of said publication is constructed such that the stator is at the anode potential so that only a relatively small air gap is required between stator and rotor. However, the fact that the stator which is outside of the X-ray tube carries anode high voltage potential increases the costs in another manner, because in the X-ray radiator associated with the X-ray tube additional measures must be taken for the high voltage strength and because the stator must be fed for the potential separation via an additional high voltage transformer.

The object of the invention is to provide an X-ray rotating-anode tube with a magnetic bearing of the rotating shaft of the anode which is at high voltage potential, which requires only a small air-gap between rotor and stator and wherein the stator yet need not be at anode potential but at another potential, preferably earth potential. To this end an X-ray tube of the type mentioned in the preamble is characterized in that the anode disc is connected via an electric insulator to the rotor and that means are present for effecting that the rotor assumes at least by approximation the same potential as the stator of the magnetic bearing which stator is preferably at earth potential.

In an X-ray rotating-anode tube according to the invention the insulator ensures the necessary high voltage strength which would otherwise be ensured by the relatively large air-gap between rotor and stator. Because rotor, stator and tube wall (vacuum sleeve) between rotor and stator, insofar they are not integrated with pole faces of the stator assembly, are by approximation at the same potential, the air gap between rotor and stator may now be very small so that a sufficiently stable bearing is also possible with relatively small electromagnets.

It should be noted that indeed the sheet metal assembly of the stator has an accurately defined potential, but not the stator winding because voltages are supplied thereto which change in the time. If herebelow it is yet indicated that the stator has a given potential, for example earth potential, then this means that the equipotential of the stator corresponds to the earth potential or, respectively, that the deviation of the equipotential from the earth potential is small as compared with the anode high voltage.

In a preferred embodiment the potential supplied to the rotor is ensured via a sliding contact. Therein the rotor is earthed when the stator has earth potential, which is generally the case. The sliding contacts for the anode disc and for the rotor are placed on various sides of the anode which enables positioning of the sliding contact for the anode in the centre of the (material) rotating shaft of the anode disc and the sliding contact for the rotor in the centre of the (immaterial) rotating shaft of the rotor. Consequently the friction losses caused by the sliding contact are at a minimum.

In a further construction a deviation of the rotor potential in the positive direction relative to the stator potential is prevented by an electron source. As soon as the rotor potential becomes considerably more positive than the stator potential a filament emits a current which reduces this difference in potential. For this purpose an emission current in the micro-ampère range is already sufficient.

Below the invention will be described with reference to embodiments shown in the drawing.

Figure 2:
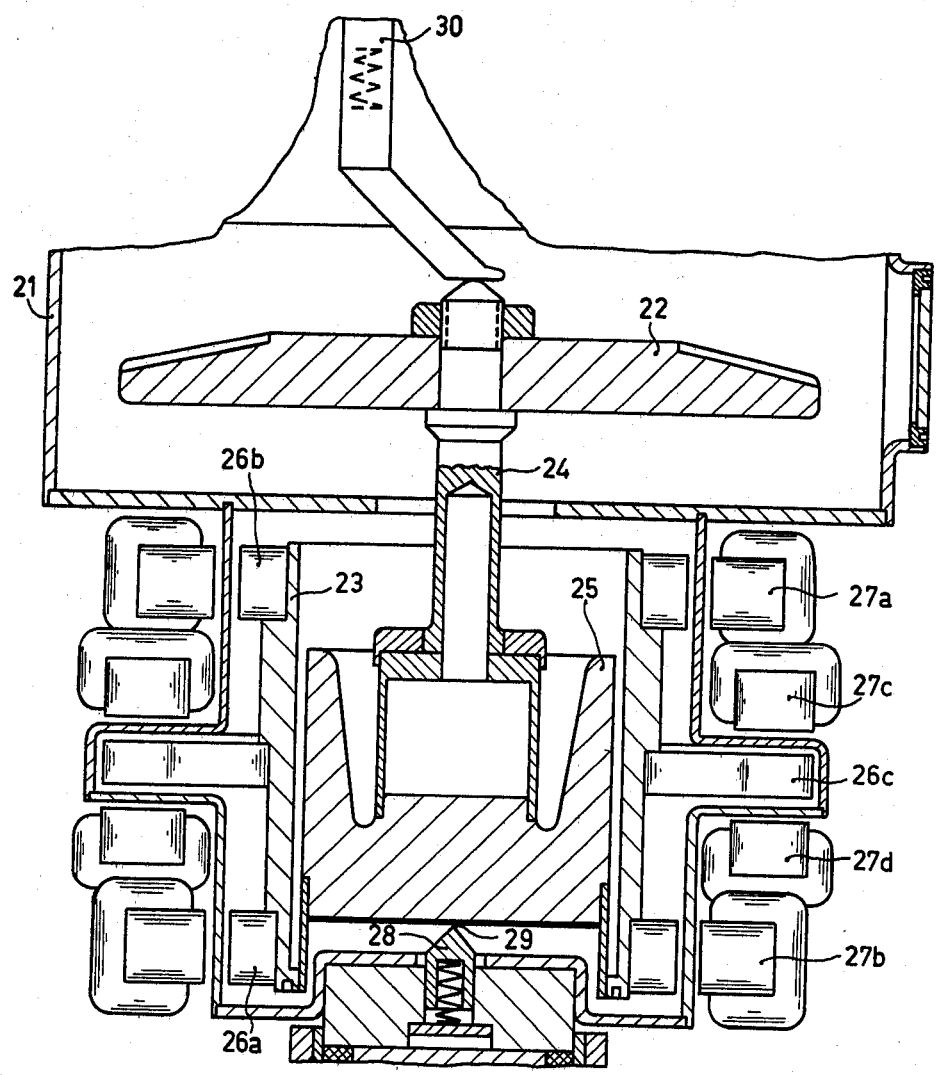

In the drawing:

FIG. 1 shows an X-ray rotating-anode tube with a magnetic bearing on both sides and FIG. 2 shows a portion of an X-ray rotating-anode tube having radial and axial (unilateral) magnetic bearings placed on the same side.

The X-ray tube showed in FIG. 1 comprises a metal sleeve 1 which at least in the area of the rotors or stators respectively, is of a non-magnetic metal or of a non-magnetic metal alloy respectively having a high electric resistance to keep eddy current losses low. An anode disc 2, operatively positioned with respect to a cathode electrode 3, is connected to a continuous hollow rotating shaft 4. Insulators 5a and 5b respectively are disposed at both ends of the shaft 4. Ferro-magnetic laminar-shaped rotors 6a and 6b respectively are placed on an outer circumference of the insulators 5a and 5b respectively. Like the insulators these rotors have the shape of a truncated hollow cone. The metal sleeve 1 is in situ of the rotors adapted to this shape and carries there a stator which each time consists of at least three electromagnets 7a and 7b respectively which are placed equidistantly on the circumference.

The electromagnets 7a and 7b respectively exercise a force of attraction on the ferro-magnetic rotors 6a and 6b respectively which fixes them in the equilibrium conditions in a defined position in both—owing to the conical shape-in the axial and in the radial direction. Inductive or capacitive sensors, which are not further shown, are applied inside or outside of the metal sleeve, which sensors register a deviation of the defined position and activate a very rapid electronic control which, depending on this deviation, controls the energization of the electromagnets such that said deviation is reduced to a minimum and the rotor again returns to the defined starting position. If the rotors 6a or 6b deviate in axial direction from the defined position, then the electromagnets 7a on the one hand and the electromagnets 7b on the other hand are controlled in the opposite sense to compensate for this deviation. Magnetic bearings having such adjustments and controls are known per se and are a normal commercial product so that a further description is superfluous.

The stator windings which cause the rotor to rotate are not shown in the drawing. They may be distributed over the circumference between the electromagnets 7a or 7b respectively, only a relatively low driving force being required, because on the one hand the distance to the rotor is relatively small, and on the other hand the rotors or the rotating anode disc can be kept continuously rotating because of the wear-resistant magnetic bearing so that a strong acceleration of the rotating anode immediately prior to a photograph being taken can be dispensed with. If a rotary field is superimposed on the field of the electromagnets which stabilizes the rotors in their position, then the stator windings can even be fully omitted.

On the side which faces away from the anode disc 2 the insulator 5a is provided with a central hole, through which a spring contact 8 pushes a metal ball 9 against the end face 10 of the rotary shaft the centre of rotation so that the friction losses produced thereby are at a minimum.

The other insulator's end face, which faces away from the anode disc 2, is provided with a metal coat 11, which is connected to the rotor in a conducting manner. A ball 12 which is accommodated in the rotary shaft of the insulator and which is preferably pushed by means of a spring (not shown in the drawing) against the metal coat 11, forms an electrically conducting connection between the metal coat 11 and the metal sleeve 1. Consequently thr rotor potential corresponds to the potential of the tube bulb which in its turn corresponds to the stator potential so that only a very small gap is required between the electromagnets of the stator, the tube bulb in this area and the rotor.

The potential of the other rotor is set by a conductor 13 which is passed through the insulator 5b and the rotary shaft 4 and which connects the rotor 6a to a metal coat 11. A suitable arrangement and rating must ensure that no flash-over is produced between the conductor 13 which carries the rotor potential and the transverse shaft 4 which is at the anode potential. The electric connection between the metal coating 11 and the rotor 6a can also be obtained by means of a conductor which directly interconnects the rotors 6a and 6b and which is passed through a sufficiently large hole in the anode disc. Herein it is favorable to provide several (at least two) holes in the anode disc which are symmetrically arranged with respect to the shaft 4, and uniformly distributed relative to one another along the circumference, a conductor being passed through each hole to avoid imbalance.

Adjusting the rotor potential can also be effected by placing an electron source in the area of the rotor 6a. An electrically conducting connection between the two rotors can then be omitted.

In the embodiment shown in FIG. 2 the metal sleeve of the X-ray tube is indicated by 21 and the anode disc by 22, which is supported by a rotary shaft 24 to which an insulator 25 is fastened. The insulator is connected to a hollow cylinder 23, whose outer surface is provided with two embracing rotors 26a and 26b which in conjunction with stators provided outside the tube bulb, each having a plurality of electromagnets 27a and 27b respectively which are uniformly distributed along the circumference, ensure a defined radial bearing. The axial bearing is effected by means of a further rotor 26c arranged between the rotors 26a and 26b which — viewed in the axial direction — is kept floating by means of the electromagnets 27c and 27d respectively which are arranged on both sides of the rotor outside the tube bulb. Also here sensors, not further shown in the drawing, are provided which register deviations from the defined position both in axial and radial direction and which cause the electromagnets to be put into operation as regards a readjustment of the proper position.

The potential of the rotors 26a to 26c inclusive is effected by means of an earthed contact pin which is pushed by means of spring action against a metal coating on the side of the insulator 25 which faces away from the anode disc. The metal coating 29 which the contact pin 28 engages exactly in the centre of rotation is connected via a metalplated insulator surface to the metal cylinder 23 so that as a result also the rotors 26a ... 26c are earthed.

The supply of the anode high-voltage potential is effected via a further contact pin 30 which is pushed by means of spring action against the rotary shaft end which extends from the anode disc. The rotary shaft is provided with a rounding to keep the friction as low as possible.

In the embodiments according to the invention which are described in FIG. 1 and FIG. 2 the rotor might advantageously be laminated to keep the eddy-current losses as low as possible. In principle any other principle of magnetic bearing is usable and suitable.

What is claimed is:

1. In a rotary anode tube with a rotary shaft and anode disc, said anode disc during operations being at a high voltage potential, said high voltage potential supplied by a moving contact located on one side of said disc and coupled to said rotary shaft, the improvement comprising a plurality of rotors electrically insulated from and supportively coupled to said rotary shaft, stator means including magnetic bearing means magnetically coupled to each of said rotors for supporting said rotary shaft for rotational freedom with respect to said stator means, and means conductively coupled to all of said rotors for placing each of said rotors at the approximate potential of said stator means.

2. A rotating anode tube as claimed in claim 1, wherein said rotor potential is supplied through a further moving contact arranged on the other side of said disc relative to said first contact.

3. The rotating anode tube as claimed in claim 1, wherein said rotor is coupled to said rotary shaft by an insulator.

4. The rotating anode tube of claim 3, further including a plurality of rotors each insulated by insulators from said rotary shaft, said anode high voltage potential being supplied through said first mentioned moving contact and through a first of said rotor insulators, and means for adjusting said rotors to equal potential levels.

5. The anode tube of claim 1 wherein said rotor and said stator are at earth potential.

* * * * *

UNITED STATES PATENT AND TRADEMARK OFFICE
CERTIFICATE OF CORRECTION

PATENT NO. : 4,081,707
DATED : March 28, 1978
INVENTOR(S) : WALTER HARTL ET AL

It is certified that error appears in the above-identified patent and that said Letters Patent are hereby corrected as shown below:

Column 2, line 18, "showns" should be --shows--

Column 3, line 9, "shaft the centre" should be --shaft, in the exact centre--.

Signed and Sealed this

Twenty-fifth Day of July 1978

[SEAL]

Attest:

RUTH C. MASON
Attesting Officer

DONALD W. BANNER
Commissioner of Patents and Trademarks